US012785346B2

(12) United States Patent

Friesinger et al.

(10) Patent No.: US 12,785,346 B2

(45) Date of Patent: Nov. 3, 2026

(54) CRIMPING DEVICE AND CRIMPING METHOD

(71) Applicant: MD Elektronik GmbH, Waldkraiburg (DE)

(72) Inventors: Johann Friesinger, Rechtmehring (DE); Markus Wallner, Ramerberg (DE); Georg Oberreitmeier, Mettenheim (DE); Walter Lang, Waldkraiburg (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 708 days.

(21) Appl. No.: 18/339,547

(22) Filed: Jun. 22, 2023

(65) Prior Publication Data

US 2024/0014618 A1 Jan. 11, 2024

(30) Foreign Application Priority Data

Jul. 5, 2022 (DE) ..................... 10 2022 116 746.1

(51) Int. Cl.
*H01R 43/05* (2006.01)

(52) U.S. Cl.
CPC .................................... *H01R 43/05* (2013.01)

(58) Field of Classification Search
CPC .... H01R 43/05; H01R 43/055; H01R 43/052; H01R 43/048; H01R 43/0228; Y10T 29/49181; Y10T 29/49183; Y10T 29/49185
See application file for complete search history.

(56) References Cited

U.S. PATENT DOCUMENTS

| | | | | | |
|---|---|---|---|---|---|
| 5,018,270 | A * | 5/1991 | Caumanns | ........... | H01R 43/055 29/748 |
| 5,752,405 | A * | 5/1998 | Gerst | ................... | H01R 43/048 72/350 |
| 6,327,775 | B1 * | 12/2001 | Oishi | ................... | H01R 43/055 29/760 |
| 7,134,190 | B2 * | 11/2006 | Bungo | ............... | H01R 43/0228 29/745 |
| 10,454,234 | B2 | 10/2019 | Particka et al. | | |
| 2018/0109057 | A1 | 4/2018 | Okuda et al. | | |

FOREIGN PATENT DOCUMENTS

| | | | |
|---|---|---|---|
| CN | 210490052 | U | 5/2020 |
| CN | 210668949 | U | 6/2020 |
| CN | 113872000 | A | 12/2021 |
| JP | 2018063870 | A | 4/2018 |
| KR | 101997685 | B1 | 7/2019 |
| WO | WO 2008087938 | A1 | 7/2008 |

* cited by examiner

*Primary Examiner* — Donghai D Nguyen
(74) *Attorney, Agent, or Firm* — LEYDIG, VOIT & MAYER, LTD.

(57) ABSTRACT

A crimping device for securing a crimp barrel on a conductor of a cable includes a crimper, an anvil that interacts with the crimper, a cutter, a cutter actuator and a holding sheet. The cutter has a receiving surface configured to receive a cable dielectric enclosing the conductor. The cutter actuator is configured to press the cutter down at a reversal point and to be actuated jointly with the crimper. The holding sheet has a molded portion on a side facing toward the receiving surface of the cutter. The molded portion of the holding sheet and the receiving surface of the cutter substantially fully encompass the cable dielectric when the cutter actuator is at the reversal point.

20 Claims, 4 Drawing Sheets

CRIMPING DEVICE AND CRIMPING METHOD

CROSS REFERENCE TO RELATED APPLICATIONS

This application claims benefit to German Patent Application No. DE 10 2022 116 746.1, filed on Jul. 5, 2022, which is hereby incorporated by reference herein.

FIELD

The invention relates to a crimping device for securing a crimp barrel on a conductor of a cable, the crimping device comprising a crimper, an anvil that interacts with the crimper, a cutter, and a cutter actuator that can be actuated jointly with the crimper. Furthermore, the invention relates to a method for crimping a crimp barrel onto a conductor of a cable, which method can preferably be carried out using the crimping device according to the invention.

BACKGROUND

From the art of cable preassembly it is known to strip a data cable comprising an inner conductor, a dielectric enclosing the inner conductor, at least one outer conductor enclosing the dielectric, and a jacket enclosing the outer conductor, i.e., to remove the radially outer jacket, and to secure a crimp barrel on, for example, the inner conductor if the dielectric (which can also be referred to as an insulator) enclosing the inner conductor has also been removed beforehand. It is also known to secure a crimp barrel on the outer conductor, which may be turned inside out and can, for example, be formed as a wire braid. The crimp barrel is secured on the exposed conductor of the cable in a crimping device, for example. In this case, the crimping device has an anvil, on which the crimp barrel rests and into which the conductor of the cable has been inserted, and also a crimper. The crimper is moved toward the crimp barrel and deforms surface portions, for example wing surfaces of the crimp barrel, in such a way that the deformed crimp barrel is secured on the conductor. In this method, the crimper is moved toward the anvil, and toward the crimp barrels arranged on the anvil, and back again cyclically in strokes having defined clocking, the crimp barrel being deformed when the crimper is in a reversal position in relation to the anvil.

From the art of cable preassembly it is also known to provide a plurality of crimp barrels in a manner secured on a carrier strip, projecting sideways from the carrier strip at a defined distance along the extension of the carrier strip. When said crimping device is operated in an automated mode, upon each stroke by which the crimper is moved toward the anvil, not only is the crimp barrel secured on the conductor of the cable, but also the crimp barrel currently being processed is severed from the carrier strip. To sever the crimp barrel from the lateral carrier strip, the crimping device has a cutter, which can be arranged to the side of the anvil, the cutter receiving the carrier strip in a carrier strip groove, as well as a cutter actuator, which can be arranged to the side of the crimper and can be actuated jointly with the crimper. At a reversal point, at which the cutter actuator is in contact with and actuates the cutter, the cutter actuator presses the cutter down, in particular counter to the bias of a spring element, such that the carrier strip groove is guided along a cutting edge, at which the carrier strip is severed from the crimp barrel currently being secured on the conductor by the crimper, by being sheared off at the cutting edge.

The crimper and the anvil that interacts with the crimper fulfill the function of securing the crimp barrel on the conductor of the cable; the cutter and the cutter actuator, which can be actuated jointly with the crimper, fulfill the function of severing the crimp barrel from the carrier strip. From practical experience it is known to introduce an intermediate shim between the crimper and the cutter actuator, i.e., a discoid molded part whose sole function is to keep the crimper and the cutter actuator spatially separate. The intermediate shim does not play any part either when securing the crimp barrel on the conductor of the cable or when severing the crimp barrel from the carrier strip since the intermediate shim ensures that a distance is maintained in each case from the cable and from the conductor of the cable at the reversal point.

Forces and stresses occur between the cutter and the cutter actuator on the one hand, and between the crimper and the anvil on the other hand, and these forces and stresses influence one another and, in particular, have a difficult-to-predict and difficult-to-repeat effect on the firmness and reproducibility of the crimp barrel being compressed onto the conductor of the cable. This issue is more pronounced in particular in automated manufacturing involving short clock times and in which the crimper and cutter actuator are actuated jointly.

WO 2008/087938 A1 (abstract) describes a crimping device having a two-part crimper, an anvil, a cutter, and a cutter actuator, the crimping device furthermore comprising a clamping device that vertically adjusts the stripped cable end in height between a crimping position, in which the crimp barrel is crimped onto the stripped end of the cable, and a position in which the cutter severs the crimp barrel from the carrier strip. At one of the two side portions, the cutter actuator has a side piece that is closer to the cutter, and a bottom edge of the side piece of the cutter actuator interacts with a side face of the cutter in order to actuate the cutter. In this case, the cutter actuator is rigidly connected to the two-part crimper.

SUMMARY

In an embodiment, the present invention provides a crimping device for securing a crimp barrel on a conductor of a cable. The crimping device includes a crimper, an anvil that interacts with the crimper, a cutter, a cutter actuator and a holding sheet. The cutter has a receiving surface configured to receive a cable dielectric enclosing the conductor. The cutter actuator is configured to press the cutter down at a reversal point and to be actuated jointly with the crimper. The holding sheet has a molded portion on a side facing toward the receiving surface of the cutter. The molded portion of the holding sheet and the receiving surface of the cutter substantially fully encompass the cable dielectric when the cutter actuator is at the reversal point

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
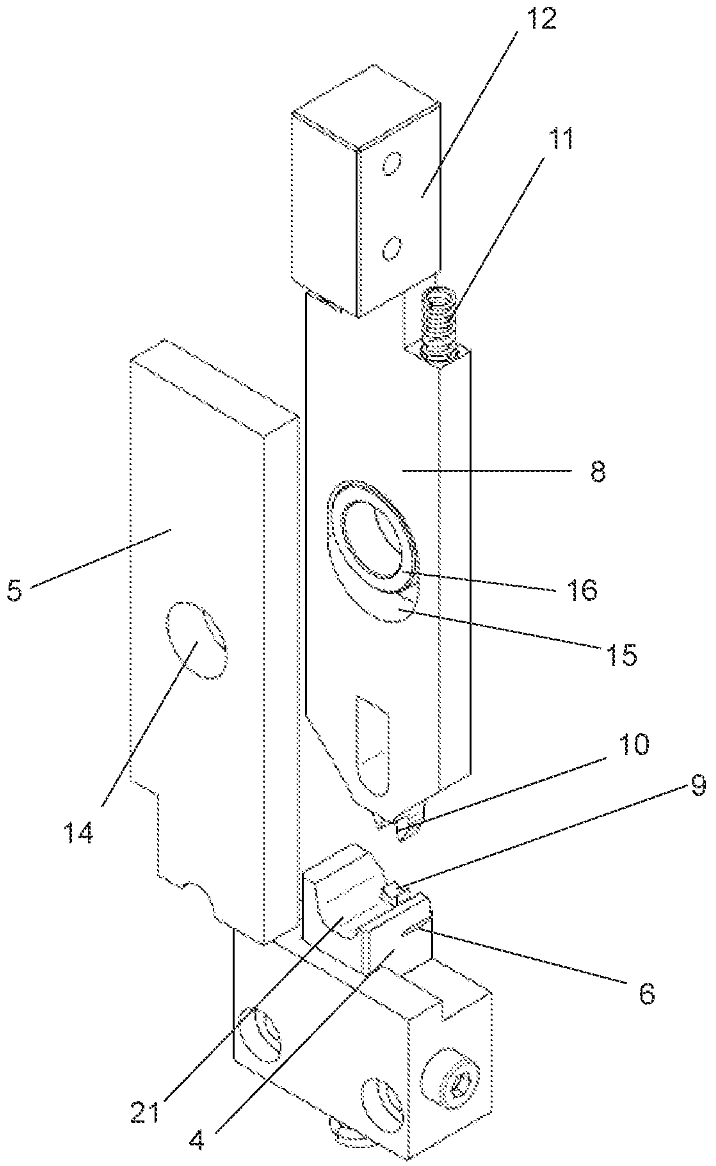
FIG. 1 is a perspective exploded view of components of an embodiment example of a crimping device according to the invention.

In an embodiment, the present invention provides a crimping device in which the flow of forces and stress behavior are easier to predict.

The crimping device according to an embodiment of the invention substantially achieves that the flow of forces and stress behavior are easier to predict by the following features:

- a receiving surface is provided on the cutter in order to receive the cable dielectric enclosing the conductor,
- furthermore, a holding sheet is provided, which has a molded portion on the side facing toward the receiving surface of the cutter, and
- the molded portion of the holding sheet and the receiving surface of the cutter substantially fully encompass the cable dielectric when the cutter actuator is at the reversal point.

In this case, the holding sheet is arranged between the crimper and the cutter actuator and can be actuated jointly with the crimper and the cutter actuator.

Encompassing the cable dielectric at the reversal point, at which the cutter actuator presses the cutter down counter to the bias of the spring element of the crimping device, allows the cable to be held inside the crimping device securely, adjustably, and reproducibly, and also allows for separation of the forces and mechanical stresses occurring on the one hand between the crimper and the anvil interacting with the crimper, and on the other hand between the cutter and the cutter actuator.

For this purpose, a receiving surface is provided on the cutter and is configured to receive the dielectric enclosing the conductor, for example substantially or approximately form-fittingly in some portions.

Furthermore, a holding sheet is provided, which is arranged as a defined tool ram between the cutter actuator and the crimper, the holding sheet having a molded portion on a side facing toward the receiving surface of the cutter, the molded portion of the holding sheet having a shape that is defined in relation to the dielectric. In this respect, the molded portion of the holding sheet can be shaped in relation to the dielectric enclosing the conductor in such a way that the molded portion likewise receives the cable dielectric substantially or approximately form-fittingly in some portions.

Preferably, the receiving surface of the cutter is formed as a surface portion that projects with respect to the adjoining surface of the cutter.

Preferably, the receiving surface of the cutter has a circle-segment-shaped cross-sectional profile, and a radius of curvature of the cross-sectional profile being adapted to the radius of the dielectric.

Furthermore, the molded portion of the holding sheet preferably has a circle-segment-shaped cross-sectional profile, and a radius of curvature of the cross-sectional profile of the molded portion being adapted to the radius of the dielectric.

If both the radius of curvature of the cross-sectional profile of the receiving surface of the cutter and the radius of curvature of the cross-sectional profile of the molded portion of the holding sheet are adapted to the radius of the dielectric, then the radii of curvature of both the molded portion and the receiving surface preferably substantially correspond to the radius of the dielectric or are approximately 10% to approximately 20% smaller than the radius of the dielectric.

If the radii of curvature of the cross-sectional profiles of both the receiving surface and the molded portion are the same, the cable dielectric is annularly surrounded when the cutter actuator is at the reversal point with respect to the cutter, such that the dielectric is received inside a resulting total contour formed from the cross-sectional profile of the receiving surface and the cross-sectional profile of the molded portion, the two cross-sectional profiles merging into one another when the cutter actuator is at the reversal point with respect to the cutter. If, in addition, the diameter of the total contour surrounding the dielectric is smaller than the diameter of the dielectric, then the dielectric is substantially radially compressed at the reversal point such that a diameter of the dielectric can be permanently reduced. Reducing the diameter of the dielectric in this way may be acceptable as long as the line properties of the conductor are not compromised; occasionally, reducing the diameter of the conductor dielectric may even be desirable. However, it should be noted in this case that in a method for crimping a crimp barrel onto a conductor of a cable, the diameter of the cable dielectric is reduced while the crimper is being moved relative to the anvil, i.e., while at least a portion of the crimp barrel is being deformed by the crimper being moved relative to the anvil in such a way that the deformed portion of the crimp barrel is secured on the conductor of the cable. In particular, the reducing of the diameter of the dielectric is integrated in the clocked sequence of the crimping operation and does not require any upstream or downstream process step. It should also be noted that reducing the diameter of the conductor dielectric does not require any material to be removed from the dielectric or any heat to be input into the dielectric since the diameter is reduced at ambient temperature, specifically at the clock frequency at which the crimper and the anvil are operated during the crimping operation, i.e., when securing the crimp barrel on the conductor of the cable.

As regards the design of the cutter of the crimping device, the cutter can preferably be formed in one piece, in particular as a wire erosion part.

Furthermore, a tension spring can preferably be provided for the crimping device, which tension spring forces the holding sheet in the direction of the receiving surface of the cutter so that said holding sheet is ahead of the cutter actuator.

If, in particular, the aforementioned tension spring is provided on the holding sheet, then for the crimping device it can preferably be provided that a catch is formed on the cutter actuator and that the catch is received in a slot in the holding sheet so as to be guidable between two end positions. When the cutter actuator is at the reversal point, the catch is located at one of the two end positions of the slot, so the degree to which the radius of the dielectric is deformed can be adjusted by means of the design of the slot, in particular of the end positions of the slot.

Figure 4:
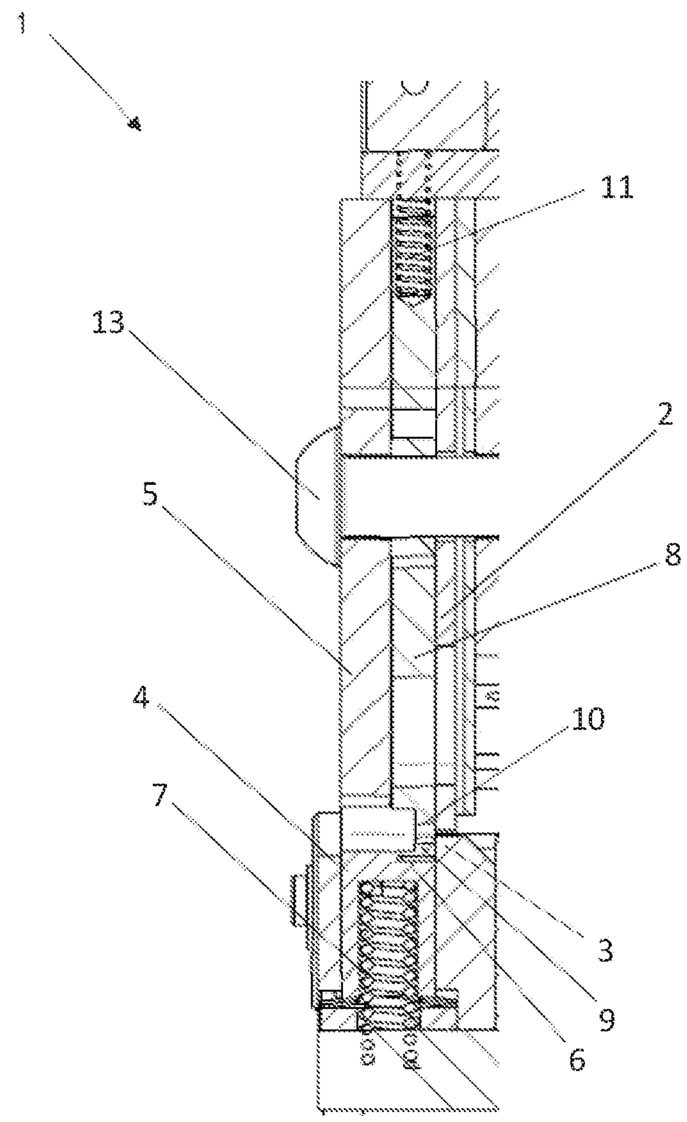
FIG. 4 shows a segment of a sectional view of the embodiment example of the crimping device according to the invention from FIGS. 1, 2*a*, 2*b*, and 3.

FIG. 4 shows a segment of a cross-sectional view of an embodiment example of a crimping device 1 according to the invention. The crimping device 1 is configured for securing a crimp barrel on a conductor of a cable, in particular a data cable. In this case, the cable comprises the conductor, a dielectric enclosing the conductor, a second conductor enclosing the dielectric, and a jacket enclosing the second conductor. The crimp barrel is secured on the conductor in a prepared portion in which both the jacket and the dielectric are removed from the conductor. Particularly when the second conductor is formed as a cable shield, a support sleeve may occasionally be additionally provided.

As essential components, the crimping device 1 comprises a crimper 2, an anvil 3 that interacts with the crimper 2, a cutter 4, and a cutter actuator 5 that can be actuated jointly with the crimper 2, for example in a synchronized stroke movement.

When securing the crimp barrel on the exposed conductor of the cable, the conductor is inserted into the crimp barrel, the crimp barrel being provided on a carrier strip in a manner projecting sideways thereon. The carrier strip is inserted into a carrier strip groove 6 of the cutter 4. When securing the crimp barrel on the conductor of the cable, the crimper 2, when lowered in the direction of the anvil 3, plastically deforms the crimp barrel and mechanically connects the crimp barrel to the conductor in the process. The cutter actuator 5 can be actuated jointly with the crimper 2, i.e., can be lowered in the direction of the cutter 4 in synchronization with the crimper 2, such that, at a reversal point, at which the cutter 4 is contacted by the cutter actuator 5 and experiences a force pulse, the cutter actuator 5 presses the cutter 4 down counter to the bias of a spring element 7 (which is formed as a helical compression spring or, in a different embodiment, comprises a helical compression spring formed having additional spring elements such as disk springs) in such a way that the carrier strip is severed from the crimp barrel at a shearing edge, which is formed at the opening in the carrier strip groove 6 of the cutter actuator 4 toward the anvil 3 adjoining the cutter 4.

A holding sheet 8 is provided between the cutter actuator 5 and the crimper 2 and formed opposite the cutter 4, and the holding sheet 8 being able to be actuated jointly with the crimper 2 and in particular jointly with the cutter actuator 5, i.e., being able to be lowered in the direction of the cutter 4 in synchronization therewith. The holding sheet 8 keeps the cutter actuator 5 and the crimper 2 separate and interacts with a receiving surface 9. The receiving surface 9 is provided on the cutter 4 and is formed on the cutter 4 as a defined surface portion. The receiving surface 9 is formed so as to receive the dielectric, enclosing the conductor of the cable, in the region in which the jacket of the cable has been removed so that the outer surface of the dielectric directly rests on the receiving surface 9 in such a way that the receiving surface 9 receives the dielectric enclosing the conductor.

Opposite the receiving surface 9, the holding sheet 8 has a molded portion 10 on the side facing toward the receiving surface 9 of the cutter 4.

Figures 2A, 2B:
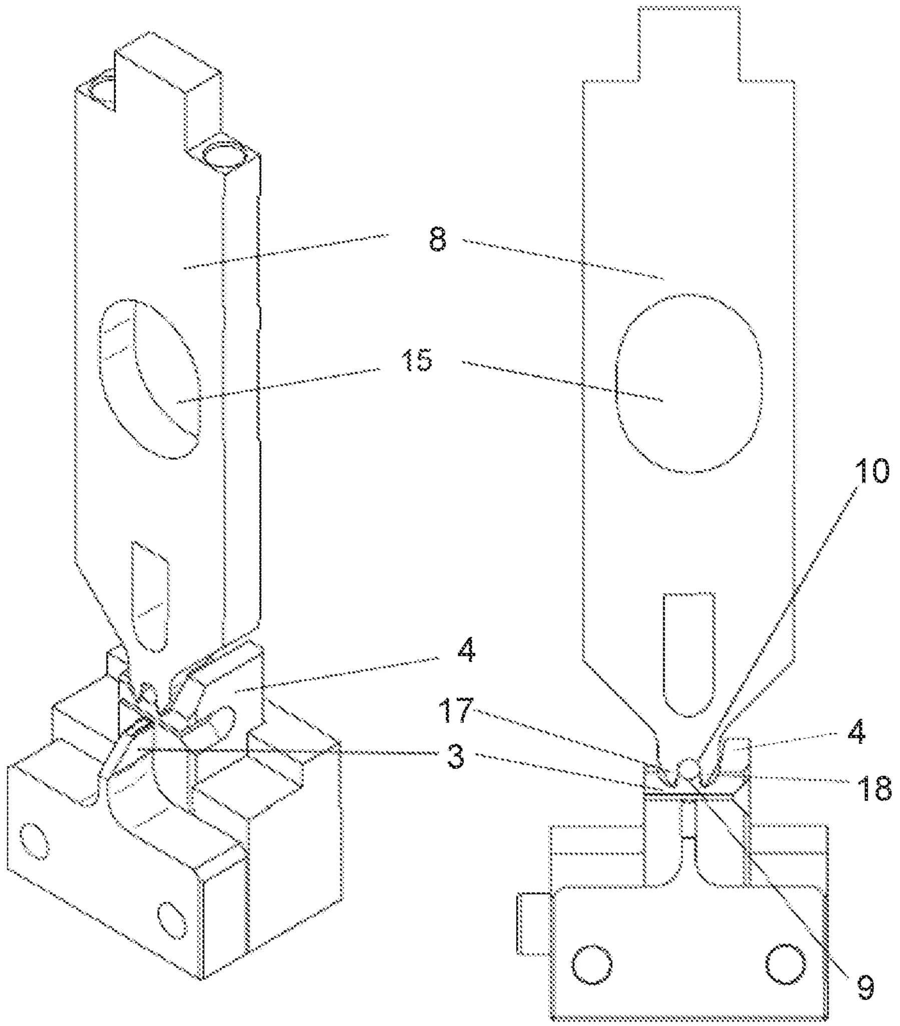
FIGS. 2*a* and 2*b* are further perspective views of further components of the embodiment example of the crimping device according to the invention from FIG. 1, in an oblique view (FIG. 2*a*) and in a front view (FIG. 2*b*)

The molded portion 10 of the holding sheet 8 and the receiving surface 9 of the cutter 4 are adapted to one another and arranged such that, at the reversal point during the actuation of the cutter actuator 5, when the cutter actuator 5 is in contact with and actuates the cutter 4, the molded portion 10 and the receiving surface 9 together substantially fully encompass the cable dielectric resting on the receiving surface 9 and from which the cable jacket has been stripped, as can be seen in particular on the basis of FIGS. 2*a* and 2*b* and as will be explained in greater detail below.

Owing to the dielectric being substantially fully encompassed when the cutter actuator 5 is at the reversal point, i.e., at the instant that the crimp barrel is plastically deformed, the dielectric, and thus the cable currently being processed, is securely held so that forces and/or mechanical stresses that occur between the crimper 2 and the cutter actuator 5 or between the anvil 3 and the cutter 4 can be absorbed and can have a minor, or at most a defined, impact on the crimping quality and the reject rate. Since the dielectric is encompassed when the cutter actuator 5 is at the reversal point, any bending or kinking of the crimped crimp barrel, or of the crimped crimp contact, in relation to the adjoining cable can be compensated for.

To be able to substantially fully encompass the cable dielectric, from which the jacket has been stripped, when the cutter actuator 5 is at the reversal point, the molded portion 10 of the holding sheet 8 has a cross-sectional profile that is open toward the cutter 4, for example a U-shaped cross-sectional profile. In addition, the receiving surface 9 of the cutter 4 has a cross-sectional profile that is open toward the cutter actuator 5, for example a U-shaped cross-sectional profile. Superimposing the cross-sectional profiles of both the molded portion 8 and the receiving surface 9 when the cutter actuator 5 is at the reversal point yields a total cross-sectional profile within which the exposed dielectric is received in a substantially fully encompassed manner between the holding sheet 8 and the cutter 4.

FIG. 1 is a perspective exploded view of the cutter 4 comprising the carrier strip groove 6, the cutter actuator 5, and the holding sheet 8 of the crimping device 1 from FIG. 4. It can be seen that one tension spring 11 is provided on each side of the holding sheet, which together force the holding sheet 8 in the direction of the receiving surface 9 of the cutter 4 so that said holding sheet is ahead of the cutter actuator 5. In this case, the tension springs 11 act on a surface portion of the holding sheet 8 facing away from the cutter 4 and are supported on a housing of the crimping device in such a way that their bias can be adjusted. Also visible is an adjustment element 12, which is used for supporting the holding sheet 8 on the housing of the crimping device and is movably mounted on the housing of the crimping device in the same way as the holding sheet 8. Using the adjustment element 12, the position of the holding sheet 8 at the reversal point can be adjusted; in particular, the extent to which the radius of the dielectric can be compressed can thus also be adjusted indirectly. Forming the holding sheet 8 in a manner biased into a leading position by the at least one tension spring 11 also makes it possible to be able to compensate for bending of the crimped crimp contact with respect to the adjoining cable portion. When the crimp contact is crimped as the crimper 2 interacts with the anvil 3, the crimped crimp contact may be bent with respect to the adjoining elongate cable portion; this can be compensated for by the holding sheet 8, which can be adjusted using the adjustment element 12 or by means of the at least one tension spring 11.

A catch 13, which can be configured as a screw (FIG. 4), is formed on the cutter actuator 5, the screw 13 being releasably received in the cutter actuator 5 inside a hole 14 formed as a threaded hole (FIG. 1), the catch 13 formed as the screw being received in a slot 15 in the holding sheet 8 so as to be guidable between two end positions. In this case, the screw 13 is surrounded by a spacer ring 16 in the region of the holding sheet 8, the spacer ring 16 being arranged in a first end position at a first end portion of the slot 15 pointing away from the cutter 4 when in a first position in which the holding sheet 8 maintains a maximum distance from the cutter 4 (FIG. 1), and being arranged in a second end position at a second end portion of the slot closest to the cutter 4 when in a second position in which the holding sheet 8 maintains a minimal distance from the cutter 4 (position in FIGS. 2*a* and 2*b*). Guiding the catch 13 in the slot in the holding sheet 8 allows the holding sheet 8 to be biased to be ahead of the cutter actuator by the action of the tension springs 11, which are formed as helical compression springs in the embodiment example shown in FIG. 1. In this case, the holding sheet 8 is guided so as to be displaceable between the end positions of the slot 15 with respect to the cutter actuator 5. In particular, the holding sheet 8, which is forced ahead of the cutter actuator 5 by the tension spring 11, can also have the effect whereby the exposed cable dielectric is kept pressed toward the cutter 4 under a slight bias in cooperation with the receiving surface 9 of the cutter 4. Owing to the holding sheet 8 being biased by the at least one tension spring 11 so as to be ahead of the cutter actuator 5, during operation the cable is first fixed in place in the region of the exposed dielectric, and the cutter 4 is actuated by the cutter actuator 5 after a delay.

FIGS. 2*a* and 2*b* show the holding sheet 8, the anvil 3, and the cutter 4 when the cutter actuator is at the reversal point, at which the cutter actuator is in contact with and actuates the cutter 4. At this reversal point, the holding sheet 8 is likewise at a minimal distance from the cutter 4. It can be seen from FIG. 2*b* in particular that the molded portion 10 of the holding sheet 8 and the receiving surface 9 of the cutter 4 can substantially fully encompass the cable dielectric. In particular, it can be seen that the receiving surface 9 of the cutter 4 has a circle-segment-shaped cross-sectional profile, and a radius of curvature of the cross-sectional profile being able to be adapted to the radius of the dielectric. It can also be seen that the molded portion has a circle-segment-shaped cross-sectional profile, it being possible to adapt a radius of curvature of the cross-sectional profile of the molded portion 10 to the radius of the dielectric. FIG. 2*b* shows in particular that the radii of curvature of the cross-sectional profiles of both the molded portion 10 and the receiving surface 9 are the same size, such that overall the cross-sectional profiles yield an approximately circular overall or total contour within which the cable dielectric is received.

The radius of curvature of the cross-sectional profile of the molded portion 10 or of the receiving surface 9, in particular the radii of curvature of both the molded portion 10 and the receiving surface 9, are adapted to the radius of the dielectric such that said radii of curvature substantially correspond to the radius of the dielectric, such that the dielectric, apart from a potential tolerance-related air gap, is received between the molded portion 10 and the receiving surface 9 without play and in a manner enclosed on all sides and all around by the molded portion 10 and the receiving surface 9. Alternatively, for the radii of curvature of the cross-sectional profile of both the molded portion 10 and the receiving surface 9, it can be provided that each radius of curvature is approximately 10% to approximately 20% smaller than the radius of the dielectric so that the dielectric is compressed on all sides, in particular radially, when the cutter actuator 5 or holding sheet 8 is at the reversal point as shown in FIG. 2*b*. This compression may result in a slight, permanent plastic deformation of the dielectric, in particular a permanent reduction in the diameter of the dielectric, which is acceptable or, occasionally, may be desirable, the dielectric being plastically deformed, in particular the diameter of the dielectric being reduced, between the molded portion 10 and the receiving surface 9 in synchronization and in the same processing stroke when the crimper is moved relative to the anvil in such a way that a portion of the crimp barrel is deformed between the crimper and the anvil and secured on the conductor of the cable.

The above-described crimping device is particularly suitable for carrying out a method for crimping a crimp barrel onto a conductor of a cable, said method comprising the steps of:

- deforming at least one portion of the crimp barrel by moving a crimper 2 relative to an anvil 3 in such a way that the deformed portion of the crimp barrel is secured on the conductor of the cable, and
- reducing a diameter of the cable dielectric while moving the crimper 2 relative to the anvil 3.

In the step of reducing the diameter of the dielectric arranged between the molded portion 10 and the receiving surface 9, the molded portion 10 and the receiving surface 9 can come into direct contact with the outside of the exposed dielectric during and simultaneously with the movement of the crimper 2 relative to the anvil 3; alternatively to direct contact, a shielding foil or remains of a shielding foil may still be positioned between the dielectric and the molded portion 10 or the receiving surface 9, the shielding foil in the conductor provided at the beginning surrounding the dielectric, optionally in addition to a second conductor formed as a cable shield.

It should be noted that the diameter of the cable dielectric is reduced not in a process step upstream or downstream of the actual crimping step but at the same time as the deformation of the crimp barrel when the crimper 2 is moving relative to the anvil 3. It should also be noted that reducing the diameter of the cable dielectric does not necessitate any thermal pre-treatment of the dielectric; the diameter can be reduced at ambient temperature.

FIGS. 2*a* and 2*b* also show that the holding sheet 8 is formed as a planar metal blank, one flat side of which abuts the cutter actuator 5 and the other, opposite flat side of which abuts the crimper 2 (FIG. 4). The crimper 2, the holding sheet 8, and the cutter actuator 5 can be activated and actuated, i.e., can be raised and lowered in the direction of the anvil and the cutter, jointly as a module; in this case, the holding sheet 8 is biased so as to be ahead of the cutter actuator 5.

FIG. 2*b* also shows that the molded portion 10 is arranged on the edge of the holding sheet 8 that points the furthest toward the cutter 4. In particular, the molded portion 10 is formed as a groove bottom of a groove, the groove bottom having the arc-shaped cross-sectional profile in some portions, and the groove being delimited by two side flanks 17, 18 (FIG. 2*b*). As also shown by FIG. 2*b*, when the cutter actuator 5 is in the reversal position, in which the holding sheet 8 is also at a minimal distance from the receiving surface 9 of the cutter 4, the side flanks 17, 18 of the groove forming the molded portion 10 are received between flanks 19, 20 (FIG. 3) of the cutter 4.

Figure 3:
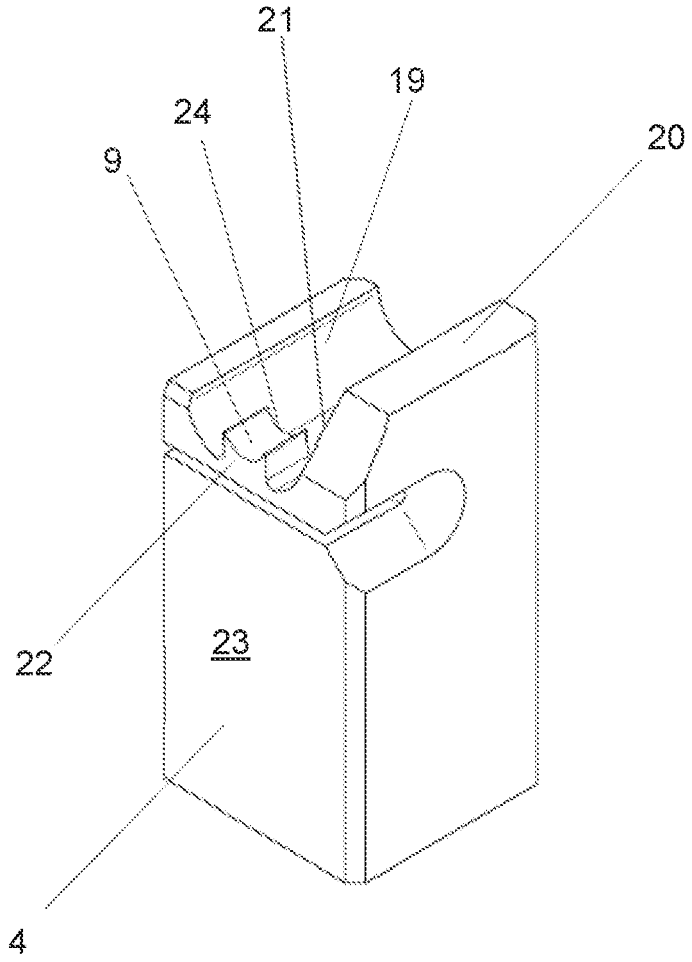
FIG. 3 is a perspective view of a cutter as a component of the embodiment example of the crimping device according to the invention from FIGS. 1, 2*a*, and 2*b*.

FIG. 3 is a perspective view of the cutter 4 from FIG. 1 and FIG. 4. It can be seen that the cutter has a surface portion 21 (see also FIG. 1) configured for receiving the peripheral surface of the cable, and has the receiving portion 9 for receiving the exposed cable dielectric from which the jacket and, where applicable, the second conductor or an outer conductor formed as a cable shield and/or as a shielding foil in a coaxial cable have been stripped. It can be seen that the receiving surface 9 of the cutter 4 is formed as a surface portion that protrudes with respect to the adjoining surface of the surface portion 21 of the cutter 4. In particular, it can be seen that a protrusion 22 is formed in the region of the surface portion 21, the receiving surface 9 being formed on the end face of said protrusion facing toward the holding sheet 8. It can also be seen that the receiving surface 9 is provided so as to adjoin a side face 23 of the cutter 4 abutting the anvil 3.

Furthermore, FIG. 3 shows that the cutter 4 is formed in one piece, i.e., from one part without any inner boundary surfaces or joint surfaces, in particular as a wire erosion part.

The surface portion 21 and the protrusion 22 comprising the receiving surface 9 for the cable dielectric are delimited on both sides by flanks 19, 20, the side flanks 17, 18 of the holding sheet 8 being arranged between the flanks 19, 20 of the cutter 4 when the cutter actuator 5 is at the reversal point. In this case, however, the holding sheet 8 maintains a distance from the cutter 4 and thus is not in direct contact with the cutter 4. When the cutter actuator 5 is at the reversal point, it is in contact with the higher flank 20 of the cutter 4 and transfers a force to the cutter 4 such that the cutter 4 is actuated and lowered.

As also shown by FIG. 3, the protrusion 22 comprising the receiving surface 9 forms, together with the adjoining surface portion 21 on which the jacket of the cable rests, an abutment edge 24 on which it is possible to place the jacket edge formed when the cable jacket (and also the outer conductor around the support sleeve in the case of a coaxial cable, for example) is removed, in order in particular to be able to position the exposed dielectric in the receiving surface 9 and thus also to be able to reproducibly align it in relation to the opposite molded portion 10 of the holding sheet 8.

In the above-described embodiment example, the receiving surface 9 was formed as a portion of the protrusion 22 that was integral with the rest of the cutter 4. It goes without saying that, in a different embodiment example, the receiving surface can be formed on an additional component secured on the cutter opposite the holding sheet 8.

In the above-described embodiment example, it was assumed that the cable was an electrical cable, in particular a coaxial cable having a second conductor or outer conductor formed as a cable shield or shielding foil, the crimp barrel having been crimped onto the inner conductor of the coaxial cable by the above-described crimping device. It goes without saying that the cable can likewise be an optical cable, on the optical conductor of which a ferrule is secured by means of the above-described crimping device. In addition, the cable can be a multi-core electrical and/or optical cable, the dielectric of which need not necessarily have a circular cross section.

In the above-described embodiment example, the cutter 4 was biased counter to the bias of a spring element in the form of a helical compression spring 7 (FIG. 4). In the event that a more rigid spring element having a higher spring constant is needed, in particular in order to also compensate for the force of the tension spring(s) 11, the helical compression spring 7 can be supplemented with one or more springs, for example with at least one disk spring or disk spring assembly having a plurality of disk springs. Alternatively, instead of the helical compression spring 7, spring elements having a higher spring constant, in particular a disk spring or an assembly of two or more disk springs, can be provided. In another different embodiment, a hard, height-adjustable stop can be provided, which, for example, is formed as a threaded rod that limits the displacement of the cutter. The threaded rod can be provided so as to be adjustable transversely to the direction of displacement of the cutter or anti-parallel to the direction of displacement of the cutter.

In addition to the embodiment example shown, the at least one tension spring 11 and/or the spring element 7 can be detected and monitored using sensors; in particular, the front end position or the compression (or longitudinal extension) of the at least one tension spring 11 and/or of the spring element 7 acting as the return spring of the cutter 4 can be detected, for example by means of a laser beam. As a result, the force that the at least one tension spring 11 or the spring element 7 exerts on the exposed dielectric can be indirectly but reliably detected; in particular, therefore, so too can the amount by which the diameter of the dielectric is reproducibly reduced when the molded portion 10 of the holding sheet 8 and the receiving surface 9 of the cutter 4 substantially fully encompass the cable dielectric, from which the jacket has been stripped, when the cutter actuator 5 is at the reversal point. The sensor, in particular the laser beam, can be arranged transversely to the extension of the at least one tension spring 11 or transversely to the spring element 7, and can detect the amount by which the tension spring 11 or the spring element 7 is stretched. Alternatively, in the longitudinal direction of the at least one tension spring 11 or in the longitudinal direction of the spring element 7, the sensor can directly detect the length and thus the bias of the tension spring 11 or spring element 7. In this case, the sensor can have a laser, or a pressure- or length-measuring sensor, or be formed in a simple form as a photoelectric sensor. The sensor, in particular the laser, can preferably be assigned to the spring element 7 provided as the return spring of the cutter 4, since the cutter 4 in particular, as an abutment of the holding sheet 8 guided so as to be displaceable against the spring element 7, has to assume a defined, repeatable, and stable end position so that, for example, the diameter of the dielectric can be reduced in a repeatable, precise manner. In particular, the sensor then detects the position, and optionally also the length, of the spring element 7. The end position of the cutter 4 can be adjusted by a crimping height adjustment mechanism of the cutter actuator 5, it being possible, by means of the crimping height adjustment mechanism, to adjust the reversal point of the cutter actuator 5 and thus also the end position of the cutter 4 fully displaced counter to the bias of the spring element 7.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Crimping device
2 Crimper
3 Anvil
4 Cutter
5 Cutter actuator
6 Carrier strip groove
7 Spring element
8 Holding sheet
9 Receiving surface
10 Molded portion
11 Tension spring
12 Adjustment element
13 Catch
14 Hole in the cutter actuator
15 Slot
16 Spacer ring
17 Side flank
18 Side flank
19 Flank
20 Flank
21 Surface portion
22 Protrusion
23 Side face of the cutter 4
24 Abutment edge

What is claimed is:

1. A crimping device for securing a crimp barrel on a conductor of a cable, the crimping device comprising:
- a crimper;
- an anvil that interacts with the crimper;
- a cutter having a receiving surface configured to receive a cable dielectric enclosing the conductor;
- a cutter actuator configured to press the cutter down at a reversal point and to be actuated jointly with the crimper; and
- a holding sheet having a molded portion on a side facing toward the receiving surface of the cutter, and
- wherein the molded portion of the holding sheet and the receiving surface of the cutter fully encompass the cable dielectric when the cutter actuator is at the reversal point.

2. The crimping device according to claim 1, wherein the cutter actuator is configured to press the cutter down at the reversal point counter to a bias of a spring element.

3. The crimping device according to claim 1, wherein the receiving surface of the cutter is formed as a surface portion that projects with respect to an adjoining surface of the cutter.

4. The crimping device according to claim 3, wherein the cable includes a jacket configured to enclose the cable dielectric and the conductor, and wherein the adjoining surface is configured to receive the jacket such that the jacket rests on the adjoining surface while the cable dielectric is received and directly contacted by the receiving surface of the cutter.

5. The crimping device according to claim 3, wherein the receiving surface is an upper periphery of a protrusion that projects upward relative to the adjoining surface.

6. The crimping device according to claim 5, wherein the protrusion faces towards the holding sheet and adjoins a side face of the cutter.

7. The crimping device according to claim 6, wherein a side face of the protrusion and the side face of the cutter are coplanar such that both are configured to simultaneously abut a flat side face of the anvil.

8. The crimping device according to claim 5, wherein the cable includes a jacket configured to enclose the cable dielectric and the conductor, and wherein the protrusion has an abutment edge configured to abut against a longitudinal periphery of the jacket.

9. The crimping device according to claim 1, wherein the receiving surface of the cutter has a circle-segment-shaped cross-sectional profile, and wherein a radius of curvature of the cross-sectional profile is adapted to a radius of the dielectric.

10. The crimping device according to claim 9, wherein the molded portion has a circle-segment-shaped cross-sectional profile, and a radius of curvature of the cross-sectional profile of the molded portion is adapted to the radius of the dielectric.

11. The crimping device according to claim 9, wherein the radii of curvature of both the molded portion and the receiving surface substantially correspond to the radius of the dielectric or are approximately 10% to approximately 20% smaller than the radius of the dielectric.

12. The crimping device according to claim 1, wherein the cutter is formed in one piece as a wire erosion part.

13. The crimping device according to claim 1, further comprising a tension spring configured to force the holding sheet in a direction of the receiving surface of the cutter so that the holding sheet is ahead of the cutter actuator.

14. The crimping device according to claim 13, wherein a catch is formed on the cutter actuator, and wherein the catch is received in a slot in the holding sheet so as to be guidable between two end positions.

15. A method for crimping a crimp barrel onto a conductor of a cable using the crimping device according to claim 1, the method comprising:
- deforming at least one portion of the crimp barrel by moving the crimper relative to the anvil in such a way that the deformed portion of the crimp barrel is secured on the conductor of the cable; and
- reducing a diameter of the cable dielectric while moving the crimper relative to the anvil.

16. The method according to claim 15, wherein the diameter is reduced at ambient temperature.

17. The method according to claim 15, comprising, prior to the deforming of the at least one portion of the crimp barrel, stripping a jacket configured to enclose the conductor and the cable dielectric from the cable to expose the cable dielectric.

18. The crimping device according to claim 1, wherein the receiving surface is configured to directly contact the cable dielectric enclosing the conductor of the cable.

19. The crimping device according to claim 1, wherein the holding sheet is arranged between the cutter actuator and the crimper, the holding sheet being configured to keep the cutter actuator and the crimper separate and further configured to interact with the receiving surface.

20. The crimping device according to claim 1, wherein the molded portion includes two side flanks and the cutter includes flanks, and wherein the two side flanks of the molded portion are configured to be received between the flanks of the cutter when the cutter actuator is at the reversal point.

* * * * *